(12) United States Patent
Marsh et al.

(10) Patent No.: US 9,119,144 B2
(45) Date of Patent: Aug. 25, 2015

(54) METHOD AND APPARATUS FOR GENERATION OF BALANCED WEIGHT PREAMBLE SEQUENCES

(71) Applicant: QUALCOMM Incorporated, San Diego, CA (US)

(72) Inventors: Gene Wesley Marsh, Encinitas, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 13/776,110

(22) Filed: Feb. 25, 2013

(65) Prior Publication Data

US 2014/0241337 A1 Aug. 28, 2014

(51) Int. Cl.
*H04W 56/00* (2009.01)
(52) U.S. Cl.
CPC ..................................... *H04W 56/00* (2013.01)
(58) Field of Classification Search
None
See application file for complete search history.

(56) References Cited

U.S. PATENT DOCUMENTS

| | | | |
|---|---|---|---|
| 7,076,015 B2 | 7/2006 | Bhatoolaul et al. | |
| 7,991,077 B1 | 8/2011 | Lee et al. | |
| 8,014,435 B2 | 9/2011 | Brink et al. | |
| 8,064,414 B2 | 11/2011 | Wallace et al. | |
| 8,218,682 B2* | 7/2012 | Iwai et al. | 375/302 |
| 8,238,320 B2 | 8/2012 | Kim et al. | |
| 8,315,191 B2 | 11/2012 | Glazko et al. | |
| 8,391,552 B1 | 3/2013 | Shaffer | |
| 8,798,221 B1 | 8/2014 | Marsh et al. | |
| 2002/0085619 A1* | 7/2002 | Cho et al. | 375/130 |
| 2005/0257106 A1* | 11/2005 | Luby et al. | 714/710 |
| 2005/0281316 A1 | 12/2005 | Jang et al. | |
| 2007/0237065 A1* | 10/2007 | Kim et al. | 370/203 |
| 2008/0112356 A1 | 5/2008 | Jung et al. | |
| 2010/0177844 A1 | 7/2010 | Ko et al. | |
| 2011/0069707 A1* | 3/2011 | Roh et al. | 370/392 |
| 2011/0069781 A1 | 3/2011 | Deguchi | |
| 2011/0200058 A1 | 8/2011 | Mushkin et al. | |
| 2012/0044796 A1 | 2/2012 | Yoon et al. | |

* cited by examiner

*Primary Examiner* — Benjamin H Elliott, IV
(74) *Attorney, Agent, or Firm* — Arent Fox LLP

(57) ABSTRACT

Various aspects of an approach for generating a large number of balanced weight sequences such as balanced Hamming weight preamble sequences are described herein. The approach provides for the generation of balanced weigh sequences that need to satisfy requirements such as minimal cross-correlation with delayed versions of itself and other sequences in the allowed set. The approach includes creating a set of symbol groups that include balanced properties from which a sequence may be generated by selecting therefrom.

32 Claims, 9 Drawing Sheets

METHOD AND APPARATUS FOR GENERATION OF BALANCED WEIGHT PREAMBLE SEQUENCES

BACKGROUND

1. Field

Aspects of the present disclosure relate generally to wireless communication systems, and more particularly, to a method and apparatus for generation of balanced weight preamble sequences.

2. Background

Wireless communications technology has penetrated nearly every aspect of a person's daily routine. Integrated into almost every conceivable electronic device to facilitate business activities as well as personal uses such as entertainment, medicine, and exercise, wireless systems are widely deployed to provide various types of communication content such as voice, data, video, and so on. One type of wireless system technology, referred to as a wireless personal area network (WPAN), provides a wireless communication network for interconnecting devices locally around an individual person. For example, WPAN technology may serve to interconnect the now ubiquitous cell phone with other electronic and communication devices that many people may encounter at their work place, such as printers, scanners, copiers, "wired" multi-line telephone sets, keyboards, mice, etc.; or during personal activities such as exercising, shopping, or dining, such as exercise machines, cash registers, cycling speedometers/odometers, pedometers, automated menu systems, etc. WPAN technology may even serve a more specialized purpose, such as in health care, where wireless sensors may be placed on or near a patient to allow medical professionals to monitor that patient—whether that patient is actually in a medical care facility such as a hospital or remotely through the use of a cell phone or other wireless communication device carried around by that patient.

In order for devices to wirelessly communicate with each other, they must be able to synchronize their timing as well as identify each other. One way of achieving synchronization is through transmission of predefined sets of signals preceding data in a transmission between the devices. For example, transmission of each data packet by a transmitting device may be preceded by a transmission of a structured sequence of alternating 1's and 0's to allow a receiving device to synchronize its local clock with that of the transmitting device. These transmitted structures are generally referred to as preamble structures.

Existing approaches for creating preamble structure involve generation of preamble sequences that have good correlation properties. However, only some of these preamble sequence generation approaches also take into account resource use on the receiving device to allow for efficient detection of these preamble sequences. Fewer still of these preamble sequence generation approaches can also support creation of a large universe of possible preamble sequences having these good correlation properties to be able to support a large number of devices.

In order to be able to support a large number of devices with distinctive preamble sequences and the other desirable properties as mentioned above, other approaches are desired.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of an approach for generating a large number of balanced weight sequences such as balanced Hamming weight preamble sequences are described herein. The approach provides for the generation of balanced weight sequences that need to satisfy requirements such as minimal cross-correlation with delayed versions of itself and other sequences in the allowed set. The approach includes creating a set of symbol groups that include balanced properties from which a sequence may be generated by selecting therefrom.

In one aspect, the disclosure provides a method of wireless communication that includes generating a first set of symbols, wherein the first set of symbols includes a pre-balanced property; rearranging positions of at least two symbols in the first set of symbols to form a second set of symbols, wherein the second set of symbols maintains the pre-balanced property; and transmitting a preamble sequence based on the second set of symbols.

Another aspect of the disclosure provides an apparatus for wireless communication that includes means for generating a first set of symbols, wherein the first set of symbols comprises a pre-balanced property; means for rearranging positions of at least two symbols in the first set of symbols to form a second set of symbols, wherein the second set of symbols maintains the pre-balanced property; and means for transmitting a preamble sequence based on the second set of symbols.

Yet another aspect of the disclosure provides a computer program product that includes a computer-readable storage medium having code executable by a processing system for generating first a set of symbols, wherein the first set of symbols comprises a pre-balanced property; rearranging positions of at least two symbols in the first set of symbols to form a second set of symbols, wherein the second set of symbols maintains the pre-balanced property; and transmitting a preamble sequence based on the second set of symbols.

Still yet another aspect of the disclosure provides an apparatus for wireless communication that includes at least one processor and a memory coupled to the at least one processor and configured to cause the least one processor to generate first a set of symbols, wherein the first set of symbols comprises a pre-balanced property; rearrange positions of at least two symbols in the first set of symbols to form a second set of symbols, wherein the second set of symbols maintains the pre-balanced property; and transmit a preamble sequence based on the second set of symbols.

These and other aspects of the invention will become more fully understood upon a review of the detailed description, which follows.

BRIEF DESCRIPTION OF THE DRAWINGS

These and other sample aspects of the disclosure will be described in the detailed description that follow, and in the accompanying drawings.

Figure 1:
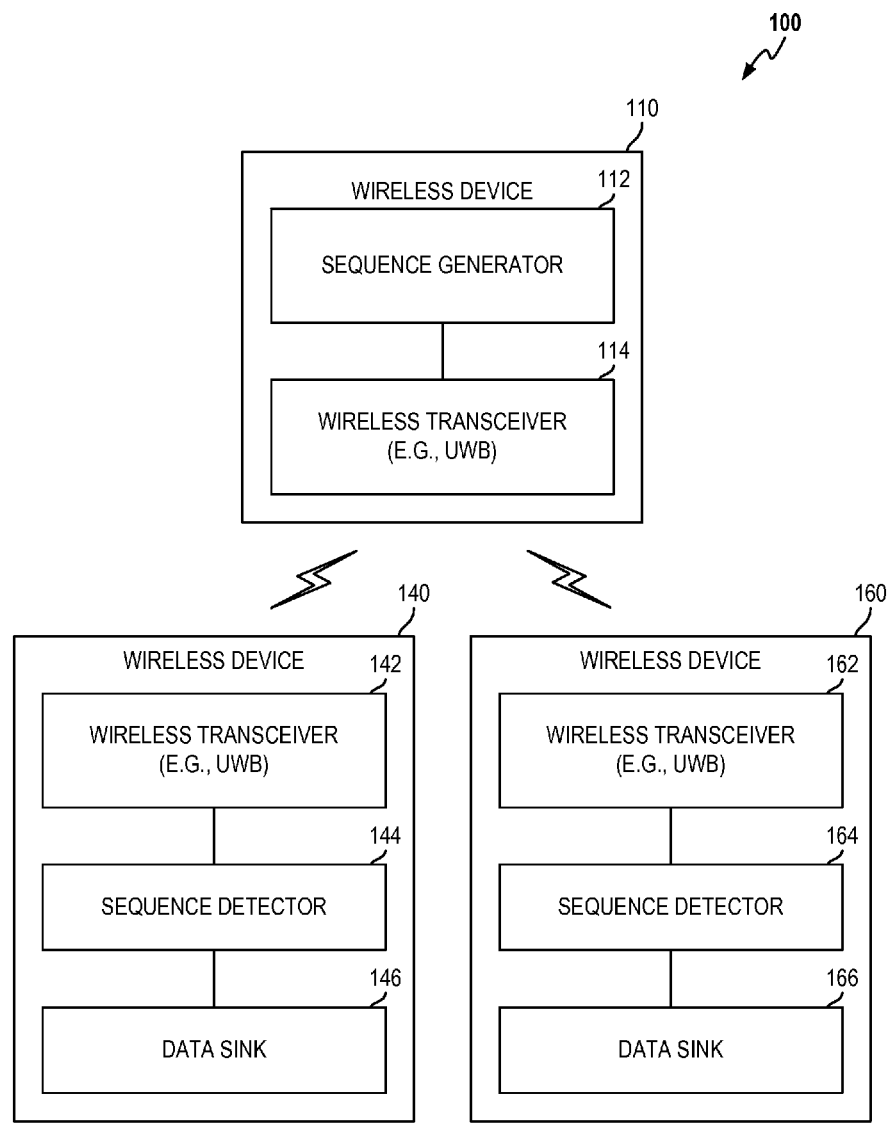
FIG. 1 is a block diagram conceptually illustrating an example of a communication scenario to which various aspects of the disclosed approach may be applied.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosed approach provide efficient approaches of generating balanced weight sequences for use in communication signals such as preamble signals. The balanced weight property provides a receiver with enhanced detection of transmitted sequences such as preamble signals, as the receiver can expect an equal number of symbols in a transmitted balanced weight sequence. The balanced weight sequences may also include such sequences such as balanced Hamming weight sequences. A large number of balanced weight sequences may be generated to create one or more allowed sets, each of which may be unique so that the balanced weight sequences may simultaneously be used with multiple communication sessions and devices.

The generated balanced weight sequences may be designed to satisfy other requirements, such as sequences having minimal cross-correlation with delayed versions of themselves and other sequences in the allowed set. Thus, sequences may be selected from the generated balanced weight sequences if they have good correlation properties, which may include small cross-correlation properties with other sequences (including shifted versions of themselves), large autocorrelation properties, or both small cross-correlation and large autocorrelation properties. Various approaches known by those in the art may be used to select balanced weight sequences having a particular emphasis on one or more of these properties. Typically, sequences are considered to have good correlation properties when there is very little correlation between the sequences as they are shifted against each other, such as from a complex inner product of one sequence with a shifted version of another sequence.

In designing sequences for preamble structures, it may be desirable to create balanced weight sequences composed of symbols chosen from an M-number of different symbol, where the term "balanced weight" refers to each sequence including an equal number of each of the M-symbols. For example, in a 2-symbol, or binary, sequence (where the sequence is made up of 0's and 1's), a balanced weight sequence would contain an equal number of 0's and 1's. Existing methods for sequence generation seek to achieve good correlation properties in the generated sequences, but without emphasis on a balanced weight characteristic. For example, in the binary case, the conventional method of generating preamble sequences using a linear feedback shift register suffers a significant probability of creating sequences with more of one symbol than the other (e.g., more 0's than 1's, or vice versa).

The desirability of using a balanced weight sequence is increased when the balanced weight sequence is applied to sequence detection algorithms that are designed to use the balanced weight characteristic, in addition to other pattern matching techniques, for purposes of sequence detection. In such cases, use of an unbalanced sequence would result in a notable performance loss—thereby creating a need for balanced or near-balanced sequences. One approach to generating balanced sequences would be through the use of Gold sequences. However, the number of sequences of length $2^N-1$ that may be created using Gold sequences is only $2^N-1$. Since balanced weight sequences are intended to serve as unique preambles for different communication devices (e.g., where each device is assigned at least one unique preamble sequence), a scalable method is needed that may be used to produce large numbers of such sequences so the number of communication devices that may be supported is not limited by the approach for generating the sequences.

FIG. 1 illustrates sample aspects of a communications scenario 100 where a first wireless device 110 may need to communicate with a second wireless device 140. In order to do so, in one aspect of the disclosed approach the first wireless 110 may first establish communication with the second wireless device 140 by first generating and then transmitting a preamble signal having a balanced weight. The first wireless device 110 may generate a preamble sequence to be used in the preamble signal in a preamble sequence generator 112 configured in accordance with a manner as discussed herein. In one aspect of the disclosed approach, the preamble sequence generator 112 may generate an M-ary sequence of length N symbols (e.g., if a sequence of 12 symbols is made up of 3 different symbols, then M=3 and N=12), using one of the procedures described below. The first wireless device 110 may communicate with the second wireless device 140 via a wireless transceiver 114 using the generated sequence, where the wireless transceiver 114 may be an ultra-wideband (UWB)-capable transceiver. The second wireless device 140 also includes a wireless transceiver 142 that may operate with the wireless transceiver 114 of the first wireless device 110.

In addition to communication with the second wireless device 140, the first wireless device 110 may also have to communicate with other wireless devices, an example of which is a third wireless device 160 as illustrated in FIG. 1 that also includes a wireless transceiver 162 that is configured to communicate with the wireless transceiver 114 of the first wireless device 110. In that case, the first wireless device 110 may use the preamble sequence generator 112 to generate another preamble signal with another preamble sequence for the third wireless device 160. In one aspect of the disclosed approach, this other preamble sequence generated for the third wireless device 160 is different from the preamble sequence generated for the second wireless device 140. The use of different preamble sequences allows different wireless devices to differentiate between transmissions sent from the first wireless device 110. Further, with appropriate characteristics, the different preamble sequences may enhance orthogonality between the transmissions of the different wireless devices, thereby reducing interference.

Each of the second and third wireless devices 140 and 160 may acquire a respective preamble signal transmitted from the first wireless device 110 to establish timing synchronization and communication with the first wireless device 110. In one aspect of the disclosed approach, to acquire the preamble signal sent from the first wireless device 110, the second and third wireless devices 140 and 160 respectively include sequence detectors 144 and 164 that may detect preamble sequences having a balanced weight. The second and third wireless devices 140 and 160 also respectively include data sinks 146 and 166 to receive information once a communication channel has been established with the first wireless device 110. Further, although not shown herein to avoid unnecessarily complicating the description of various aspects of the disclosed approach, each of the second and third wireless devices 140 and 160 may also include a preamble sequence generator that may be used to generate a balanced weight sequence to communicate with the first wireless device 110.

The elements of the system 100 may be implemented in different ways in different applications. For example, the various aspects of the approach described herein may be implemented in a system where components are attached to one another (e.g., where components are interconnected by wires) or in a system where components are detached from one another (e.g., a wireless system). Also, the various aspects of the approach herein may be employed in conjunction with processing of various types of information. For example, in some implementations this information may comprise control information that may be used to control certain operations at different components. In some implementations this information may comprise data such as audio data, video data, sensor data, or gaming data.

Various well-known methods and elements may be implemented for communicating between the first wireless device 110 and the second and third wireless devices 140 and 160, and unless otherwise noted, no further description will be provided herein as to these methods and elements so as to allow the various aspects of the disclosed approach to be more thoroughly discussed.

Figure 2:
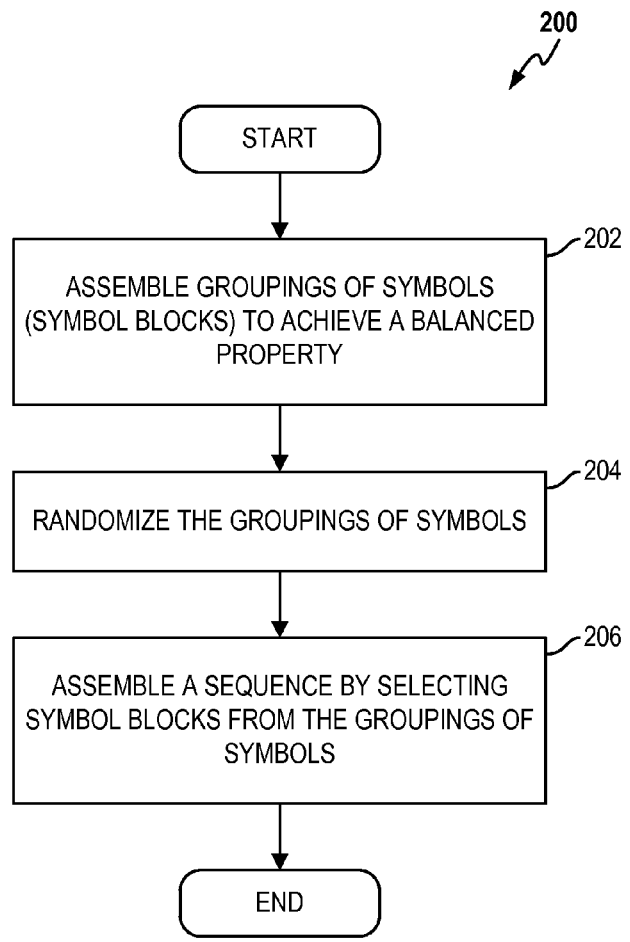
FIG. 2 is a flow diagram illustrating a preamble sequence generation process configured in accordance with various aspects of the disclosed approach for generating balanced Hamming weight preamble sequences.

FIG. 2 illustrates a preamble sequence generation process 200 configured to generate balanced weight preamble sequences that may be implemented in a preamble sequence generator such as the preamble sequence generator 112. Various aspects of the disclosed approach provide for construction of balanced weight preamble sequences of M-ary symbols having a length N using symbol blocks that are configured for balanced properties. By ensuring that symbol blocks are selected from a universe of symbol groupings having balanced properties, any preamble sequence constructed from these symbol blocks may be guaranteed to have a balanced property.

At 202, groupings of symbols that have balanced properties are assembled. For example, a plurality of symbol blocks, each having an identical number of symbols (i.e., symbol block length), may be created. In one aspect of the disclosed approach, each symbol block may include an identical multiple of each symbol of the M-ary symbols, such as one symbol each of the M-ary symbols. In another aspect of the disclosed approach, the plurality of symbol blocks as a whole may be configured to include an identical multiple of each of the M-ary symbols, such as configuring M symbol blocks such that each symbol block includes a multiple of every one of the M-ary symbols.

At 204, various aspects of the groupings of symbols from 200 may be randomized to ensure variability in a sequence generated by the preamble sequence generation process 200. In one aspect of the disclosed approach, where each symbol block in the plurality of symbol blocks includes the same multiple of a different one of the M-ary symbols, one or more symbols from one symbol block may be switched with a corresponding number of symbols from one or more of the other symbol blocks. In another aspect of the disclosed approach, where the plurality of symbol blocks as a whole are configured to include the identical multiple of each of the M-ary symbols, one or more of the plurality of symbol blocks may be randomly chosen.

At 206, a sequence may be assembled by selecting multiple symbol blocks from the plurality of symbol blocks. In one aspect of the disclosed approach, where the symbol blocks have been randomized, the symbol blocks may simply be assembled in any sequence. In another aspect of the disclosed approach, the symbol blocks may be selected at random.

Figure 3:
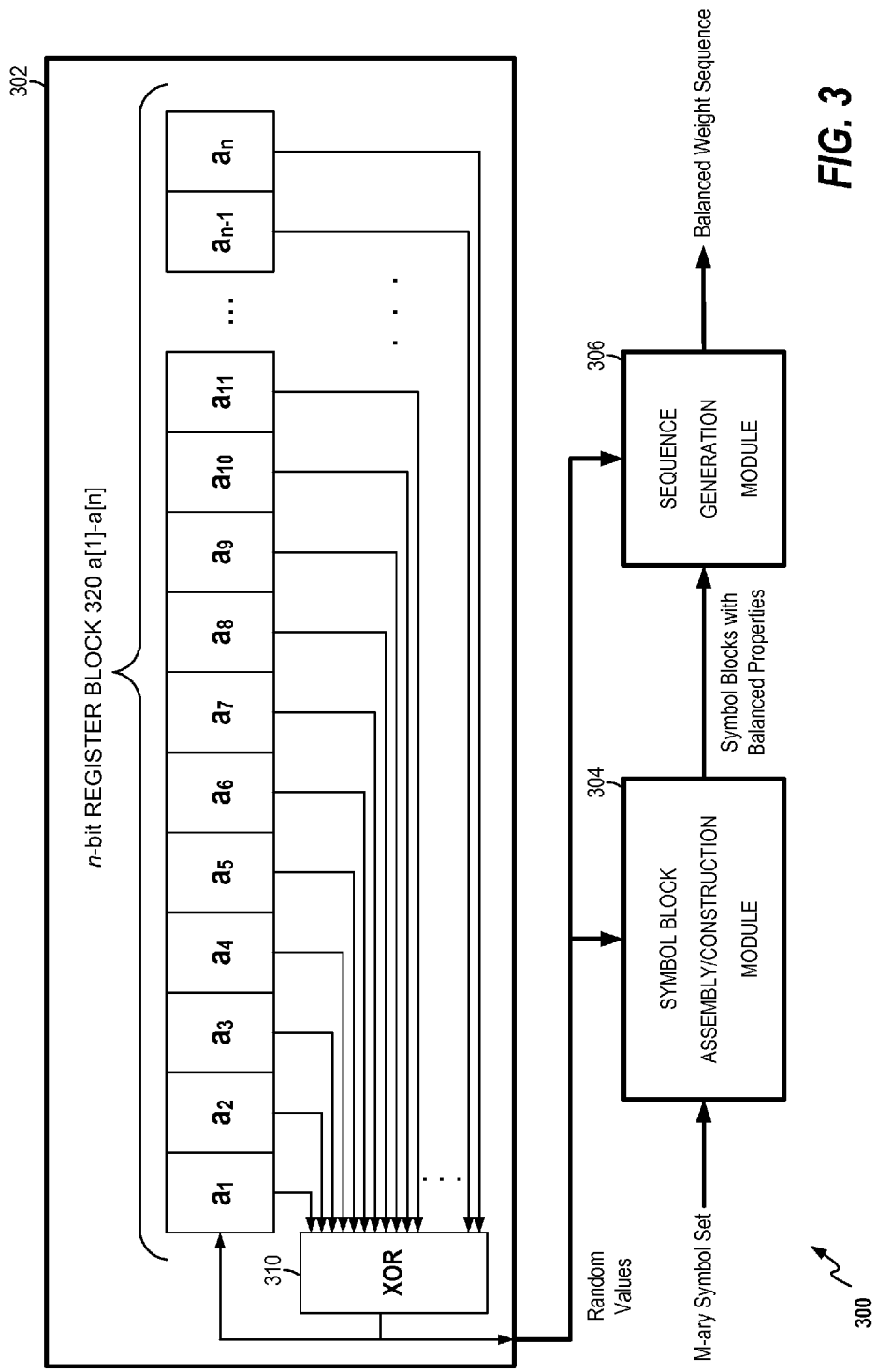
FIG. 3 is a block diagram of a sequence generator that may be used in the process of generating balanced weight sequences in accordance with various aspects of the disclosed approach.

FIG. 3 illustrates a sequence generator 300 that may be used in accordance with various aspects of the preamble sequence generation process 200 described herein. In one aspect of the disclosed approach, a random number generator that may be used as part of the sequence generator 300 in various implementations for creating balanced weight preamble sequences may be implemented using a linear feedback shift register (LFSR) 302, as illustrated in FIG. 3 as an n-bit LFSR that includes an n-bit register block 320. The LFSR 302 is used to generate random numbers that may be used in a symbol block assembly/construction module 304 to generate symbol blocks from which a sequence generation module 306 may generate desired sequences using various aspects of the disclosed approach. Thus, as further described herein, the symbol block assembly/construction module 304 may assemble a set of symbol bocks with a desired pre-balanced property, and the sequence generation module 306 may generate (or create) sequences by choosing from these symbol blocks. In accordance with various aspects of the disclosed approach, the preamble sequences generated by the sequence generator 300 maintains the pre-balanced property introduced during the sequence generation process, which is to say that the preamble sequences are formed from combinations of symbols or symbol blocks that already have a balanced property but transformed in such a way that simultaneously allows generation of a large number of preamble sequences yet still does not lose the balanced property.

A LFSR is a shift register whose output is a linear function of its previous state and, as illustrated, an output of the LFSR 302 is based on results received from an XOR function, implemented as an XOR gate 310 that receives inputs from the n-bit register block 320 with bits a[1]-a[n]. Because in an LFSR only some bits of the overall shift register value are used in the XOR function, only a particular subset of the total number of registers in the n-bit register block 320 may be coupled to the XOR gate 310. This subset may be defined, where n=72, by a primitive sequence formula as shown below:

Primitive Sequence=$x^{72}+x^{68}+x^{65}+x^{63}+x^{62}+x^{59}+x^{56}+$
$x^{55}+x^{52}+x^{45}+x^{43}+x^{41}+x^{40}+x^{39}+x^{37}+x^{36}+x^{35}+x^{31}+$
$x^{30}+x^{27}+x^{24}+x^{23}+x^{18}+x^{15}+x^{13}+X^{11}+x^{10}+x^{8}+x^{7}+$
$x^{5}+x^{4}+x^{3}+x^{2}+x^{1}$.

where $\{x_i\}$ may represent a connection to XOR gate 310 of a register at an index i in the n-bit register block 320, and:
i∈{1, 2, 3, 4, 5, 7, 8, 10, 11, 13, 15, 18, 23, 24, 27, 30, 31, 35, 36, 37, 39, 40, 41, 43, 45, 52, 55, 56, 59, 62, 63, 65, 68, 72}.

The LFSR 302 may be initialized by using a particular set of values in the n-bit register 320, referred to as a seed. In one aspect of the disclosed approach, the seed may be shared between two wireless devices so that each of them may generate the same random numbers to be used to produce an identical balanced weight preamble sequence. For example, the first and second wireless devices 110 and 140 may share a first seed so that each of them may generate a first balanced weight preamble sequence. The first and third wireless devices 110 and 160 may share a second seed different from the first seed so that each of them may generate a second, different balanced weight preamble. In accordance with various aspects of the disclosed approach, the seeds may be pre-shared and a selection process may be used to minimize or eliminate a duplicate seed being used by wireless devices in a communication scheme, such as the second and third wireless devices 140 and 160 using the same seed for communicating with the first wireless device 110.

In various aspects of the disclosed approach, because a receiver such as the wireless device 140 knows the common seed, the exact same sequence may be generated at the receiver in order to perform sequence detection. A typical process of detecting such sequences may be based on an energy accumulation. For example, in a binary case (i.e., a two symbol set consisting of zeros and ones), acquisition may be based on energy accumulation using three criteria—energy in the zeros, energy in the ones as well as the total energy. The receiver may thus accumulate the energy in all locations that it expects a one, and all other locations where it expects a zero for different possible sequence hypotheses. The hypothesis that yields the maximum total energy while exceeding a certain threshold of energy in both zeros and ones is declared the winning candidate. In addition to the maximum energy detection, the additional condition check of the energy in the zeros and ones provides greater immunity to interferers and noise as well.

Figure 4:
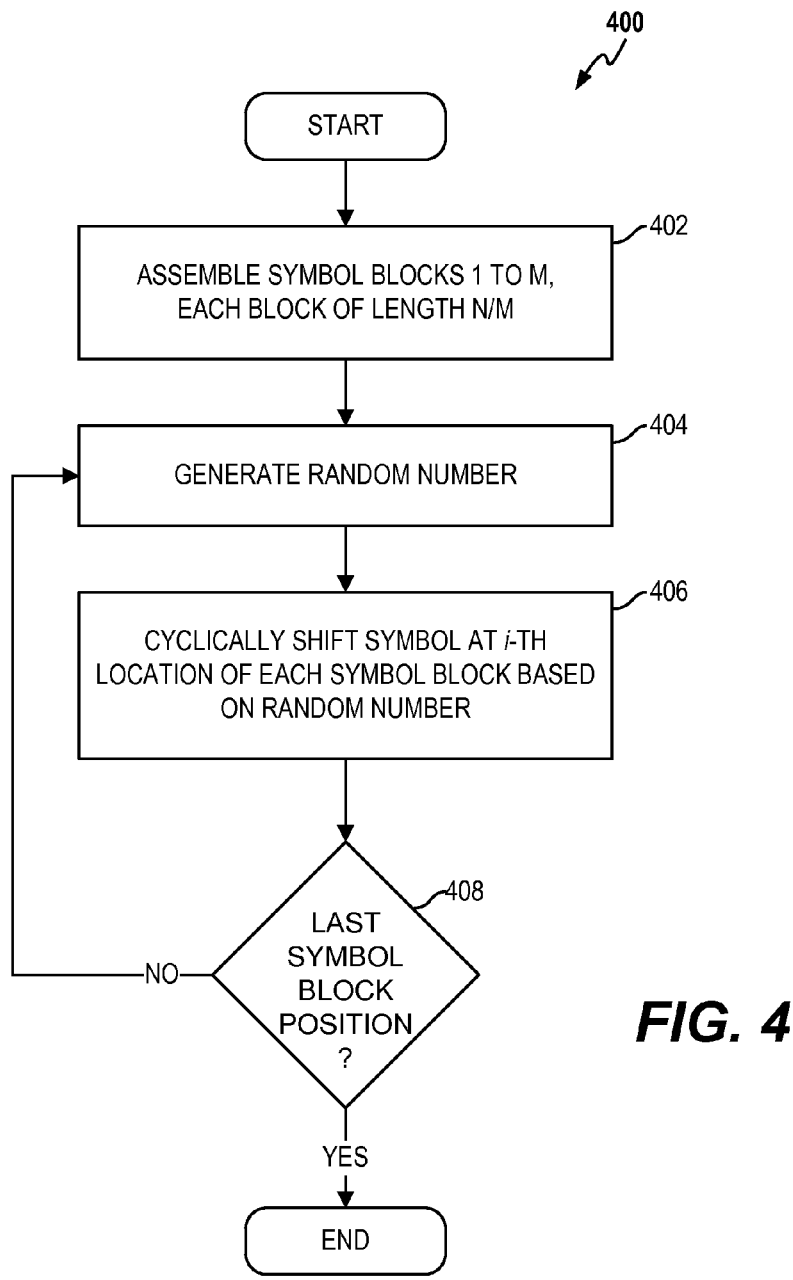
FIG. 4 is a flow diagram illustrating a cyclic shift process for generating a balanced weight sequence of length N using M-ary symbols in accordance with various aspects of the disclosed approach.
Figure 5:
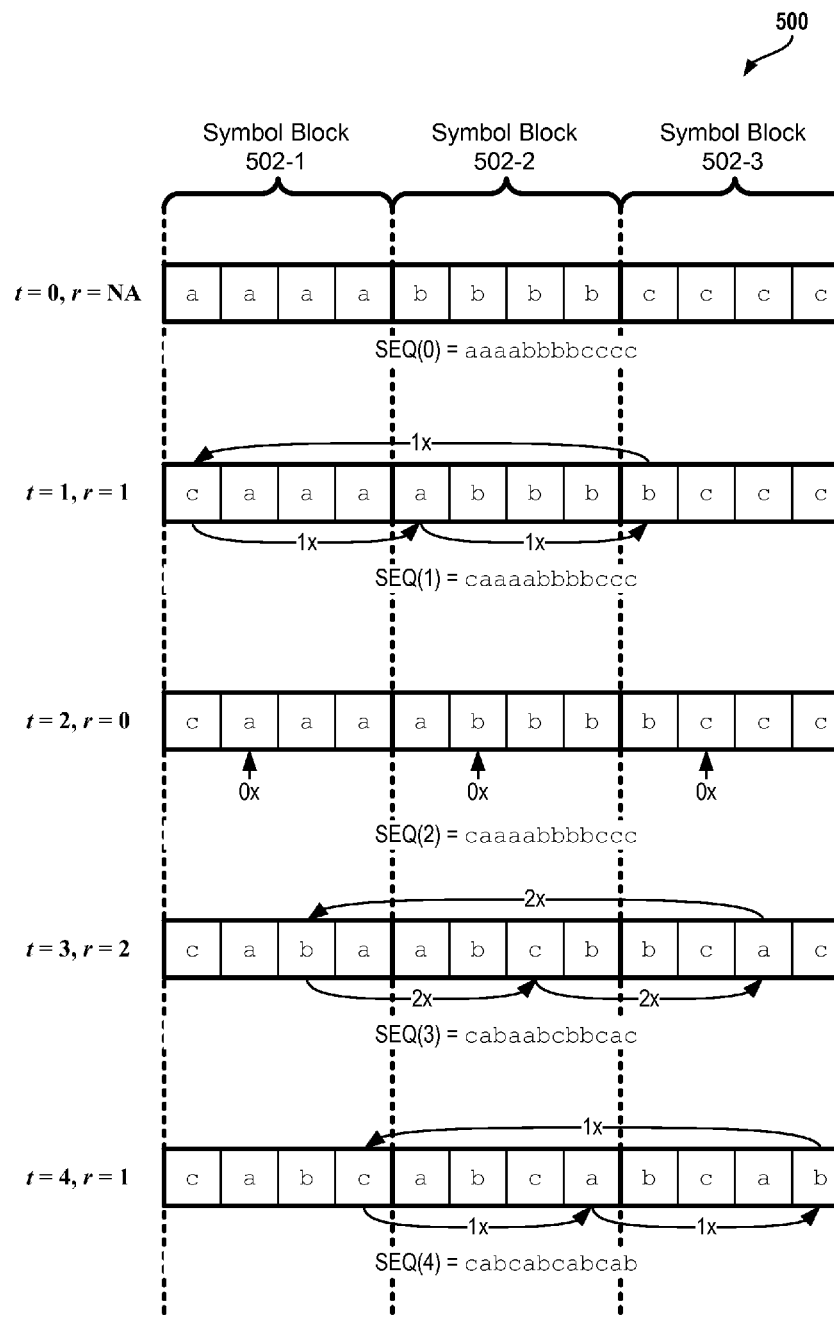
FIG. 5 is a diagram illustrating an example of symbol block manipulation for the cyclic shift process of sequence generation of FIG. 4.

Various aspects of the disclosed approach as embodied in the preamble sequence generation process 200 of FIG. 2, as well as operation of the symbol block assembly/construction module 304 and the sequence generation module 306 of FIG. 3, may be better understood through exemplary processes that are described herein. In one aspect of the disclosed approach, generation of a balanced weight preamble sequence of length N using M-ary symbols may include a process referred to as a cyclic shift process 400, as illustrated in FIG. 4, as implemented by a preamble sequence generator such as preamble sequence generator 112. The balanced weight preamble sequence may be referred to herein simply as "sequence". Reference will also be made to FIG. 5 where a specific example may be used to illustrate an operation of the cyclic shift process 200 to generate a sequence having a length of 12 symbols (N=12), where each symbol is selected from a set of three symbols {S(x), x: a, b, c} (M=3). As used herein, letters "a", "b", and "c" are being used to represent the symbols in the three symbol set. However, these letters are arbitrarily chosen to represent any three different symbols, and should not be considered to be limiting.

At 402, at the beginning of the cyclic shift process 400, the sequence generator will first obtain an initial sequence, herein referred to as seq_initial, by assembling a plurality of M symbol blocks such that:

SEQ=symbol_block[1]+symbol_block[2]+ . . . +symbol_block[M], where SEQ is the sequence that is composed of the plurality of symbol blocks, and symbol_block[x] is the x-th sequence block in the plurality of symbol blocks. In one aspect of the disclosed approach, all symbols of each sequence block will be of the same symbol, and each symbol block will have N/M symbols. In other words, the plurality of sequence blocks making up seq_initial will be composed of a symbol block [1] of length N/M consisting of symbol S(1), followed by another symbol block [2] of length N/M consisting of symbol S(2), and so on—up to a symbol block [M] of length N/M consisting of symbol S(M). Therefore, this initial sequence would have M symbol blocks, each having N/M symbols, assembled back-to-back.

A series of changes 500 to form a desired sequence (SEQ) that may occur through operation of the cyclic shift process 400 is illustrated in FIG. 5, where the SEQ is formed by combining 3 symbol blocks 502-1, 502-2, and 502-3. Each symbol block has a length of 4 symbols (i.e., N/M=12/3=4), where the symbol block 502-1 initially consists of symbol "a", symbol block 502-2 initially consists of symbol "b"; and symbol block 502-3 initially consists of symbol "c". Thus, at a time of initialization (t=0):

SEQ(0)=aaaabbbbcccc, where SEQ(t) is the sequence at a particular time t, the sequence length is 12 symbols, and each symbol block 502-1, 502-2, and 502-3 having 4 symbols.

At 404, in order to create randomization in the sequence, the sequence generator generates a pseudorandom number r between 0 and M−1. In one aspect of the disclosed approach, this pseudorandom number may be generated by obtaining log 2(M) bits out of a random number generator such as the LFSR 302. As previously noted, both the first wireless device 110 and the second wireless device 140 may need to be initialized with a common seed in order for each device to generate the same random numbers. In the example provided in FIG. 5, the random number r that is generated for use at time t=1 is 1.

At 406, the symbol at the $1^{st}$ position of each of the symbol blocks 502-1, 502-2, and 502-3 will be rotated among themselves. Thus, continuing with the example from 404, where r=1, at time t=1 the symbol "a" from the $1^{st}$ position of the symbol block 502-1 will be shifted with the symbol "b" at the $1^{st}$ position of the symbol block 502-2; which itself is shifted with the symbol "c" at the $1^{st}$ position of the symbol block 502-3. The symbol "c" that was at the $1^{st}$ position of the symbol block 502-3 will then be moved to the $1^{st}$ position of the symbol block 502-1.

In general, where an index i may be used to refer to a symbol block position to be randomized, where i=1 through N/M, at 406 the symbol at the i-th position of each symbol block will be cyclically shifted among themselves. Thus, if the pseudorandom number generated by the sequence generator in 404 has value k, then the symbols of seq_initial at positions i, i+N/M, i+2N/M, . . . , i+(M−1)N/M are circularly shifted within themselves by a number of times k. For example, if k=0, then the i-th symbol, the (i+N/M)-th symbol, . . . , the (i+(M−1)N/M)-th symbol of seq_initial remain unchanged. As another example, if k=1, then the i-th symbol, the (i+N/M)-th symbol, the (i+2N/M)-th symbol, etc. of seq_initial are circularly shifted by 1. Specifically, the i-th symbol now becomes the (i+N/M)-th symbol, the (i+N/M)-th symbol now becomes the (i+2N/M)-th symbol, and so on, up to where the i+(M−1)N/M-th symbol becomes the i-th symbol to arrive at a modified form of seq_initial, referred to as SEQ(t). As described in the example, the cyclic shift occurs in a positive direction. However, the cyclic shift may occur in an opposite direction.

At 408, the symbol block assembly/construction module 304 determines if all symbol positions have been covered, such that i=N/M. In other words, it is determined if steps 404 and 406 have been repeated for each value of i. If so, then the operation of the cyclic shift process 400 may end and the SEQ may be generated by the sequence generation module 306 assembling the symbol blocks 502-1, 502-2, and 502-3. The operation of the cyclic shift process 400 may yield a possible set of $2^{\wedge}(N/M)$ unique sequences.

Returning to the example of FIG. 5, a summary of the changes of the sequence is shown in the following table where, as discussed above, t represents the time and r represents the random number that is generated by the random number generator:

TABLE 1

Example of Balanced Weight Sequence Generation Using Cyclic Shift

| Symbol Block | t = 0, r = NA | t = 1, r = 1 | t = 2, r = 0 | t = 3, r = 2 | t = 4, r = 1 |
|---|---|---|---|---|---|
| 502-1 | aaaa | caaa | caaa | caba | cabc |
| 502-2 | bbbb | abbb | abbb | abcb | abca |
| 502-3 | cccc | bccc | bccc | bcac | bcab |

It should be noted that, for the purposes of summarizing the example, in Table 1 the symbol blocks are separated based on the original generation grouping. Thus, the actual sequence may be constructed at any time by combining the symbol block 502-1, the symbol block 502-2, and the symbol block 502-3 where, in the example given at the end of 4 periods (i.e., the end of the cyclic shift sequence generation process):

SEQ(4)=cabcabcabcab.

In addition to the cyclic shift approach as exemplified by the cyclic shift process 400, another approach referred to as a permutation process may also embody various aspects of balanced weight sequence generation of the preamble sequence generation process 200 of FIG. 2 for generating equal weight sequences of a length N using M-ary symbols. In this approach, given symbol blocks having a length of N/M symbols, there exists (N/M)! possible permutations of symbols within each symbol block. Given that there also exists M! permutations of arrangements of the M-ary symbols of length M, in one aspect of the disclosed approach an N/M number of selections from a permutation set of these M! possible arrangements may be used to construct a set of symbol blocks, and this set of symbol blocks may be combined to create a desired sequence.

Figure 6:
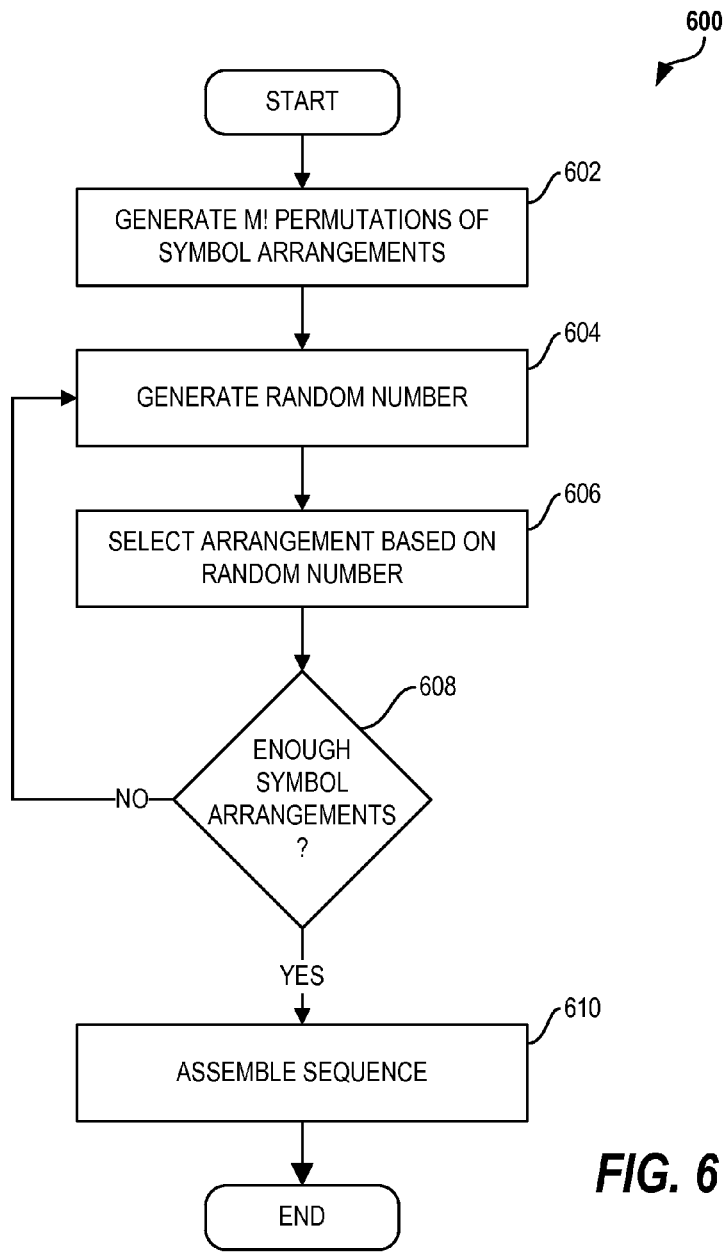
FIG. 6 is a flow diagram illustrating a permutation process for generating a balanced weight sequence of length N using randomly selected arrangements of M-ary symbols from a permutation symbol set.
Figure 7:
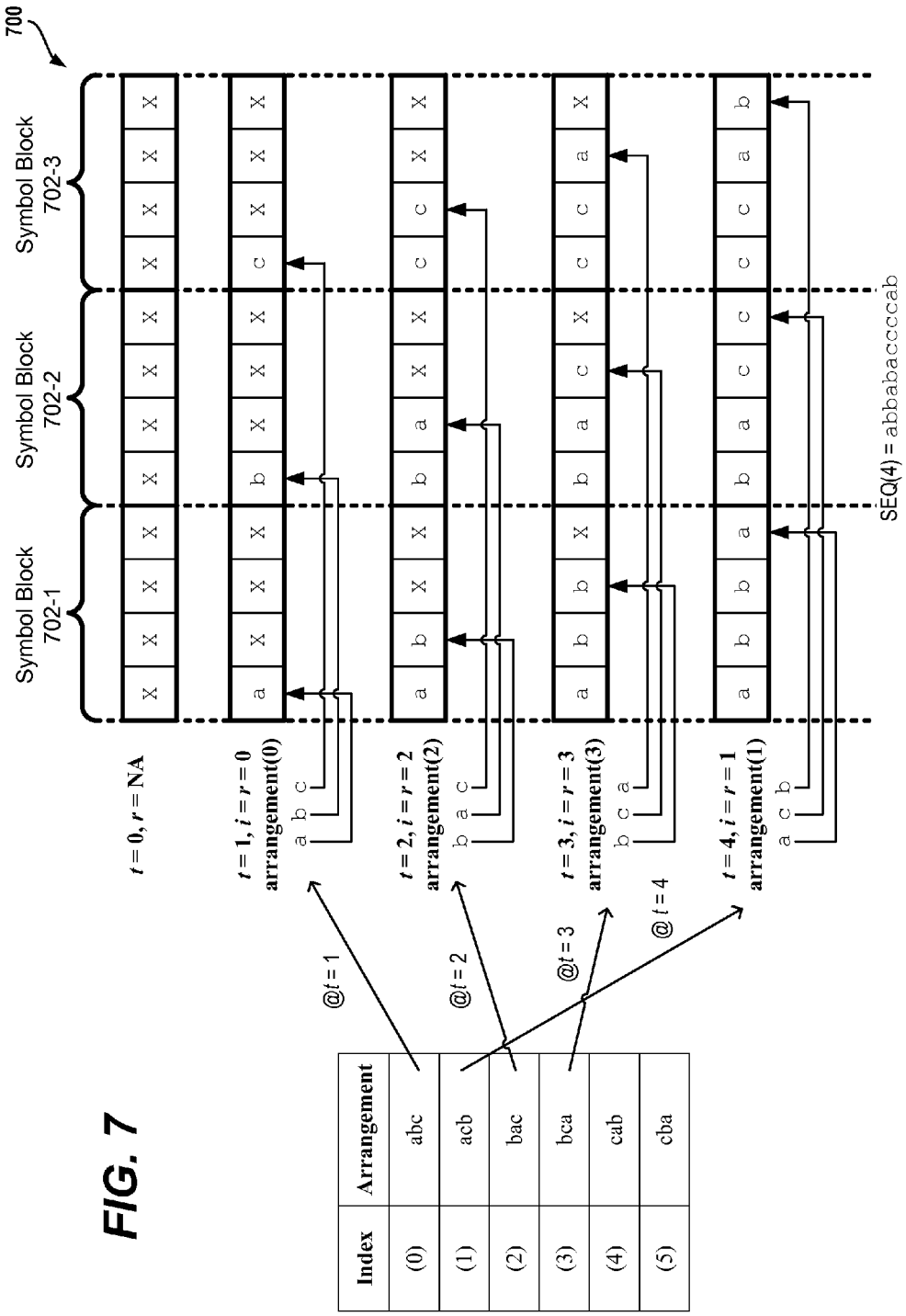
FIG. 7 is a diagram illustrating an example of symbol block manipulation for the permutation process of sequence generation of FIG. 6.

FIG. 6 illustrates a permutation process 600 that includes various aspects of generating a permutation set and an associated sequence, where arrangements of M-ary symbols from the permutation set are selected at random to generate symbol blocks that are assembled to create the associated sequence. Various aspects of the permutation process 600 may be implemented with a sequence generator such as the sequence generator 300 of FIG. 3, to which reference will be made as part of the description. In describing the permutation process 600, reference will also be made to FIG. 7, which illustrates an example series of events 700 that occurs during the creation of the desired sequence using the permutation process 600. As illustrated, the desired sequence is formed by combining 3 symbol blocks 702-1, 702-2, and 702-3, each of which being created through random selections of arrangements of pre-balanced symbols in the permutation set. Each symbol block may have a length of 4 symbols (i.e., N/M=12/3=4). In one aspect of the disclosed approach, at a time of initialization (t=0) the symbol blocks 702-1, 702-2, and 702-3 are in an initialized state and do not yet store any symbols. Conceptually, this is represented in FIG. 7 as an "X" in each position of the symbol blocks 702-1, 702-2, and 702-3.

At 602, the sequence generator 300 assembles/creates a set of symbol arrangements representing the M! possible permutations of arrangements of M symbols such that each symbol arrangement, which may be referred to simply as an arrangement herein, includes a unique arrangement of the M-ary symbols from the M! possible permutations. A symbol block assembly/construction module such as the symbol block assembly/construction module 304 of the sequence generator 300 may be used to assemble/create the set of symbol arrangements. In one aspect of the disclosed approach, each arrangement in the permutation set may be balanced such that each arrangement includes the same number of each of the symbols. Each permutation may be referenced by an index number i. For example, i may be a value from 0 to M!−1. An example of a permutation set that may be used to generate a sequence having a length of 12 symbols (N=12) using three symbols (M=3) is illustrated in the following table:

TABLE 2

Example of Permutation Set

| Index | Arrangement |
|---|---|
| (0) | abc |
| (1) | acb |
| (2) | bac |
| (3) | bca |
| (4) | cab |
| (5) | cba | where arrangement(i) refers to the permutation of the arrangement of the symbols at index i. For example, arrangement(1) refers to the arrangement "acb". In the example shown in Table 2, each arrangement includes one of each of the 3 symbols for achieving the balanced property. Other permutation sets may include the same multiple numbers of each symbols in any order in a particular arrangement.

At 604, to randomly select one of the arrangements as part of generating the sequence, the sequence generator 300 generates a pseudorandom number r between 0 and M!−1. In one aspect of the disclosed approach, a random number generator such as the LFSR 302 of the sequence generator 300 may be used to generate the pseudorandom number r.

At 606, the sequence generator 300 will select an arrangement from the permutation set using the pseudorandom number provided by the random number generator as a value for the arrangement index, i. For example, where the pseudorandom number generated for r has a value of 2, the symbol block assembly/construction module 304 may select the arrangement(2) "bac," which has the associated index value of 2, from the permutation set of Table 2 to add to the set of symbol blocks, as furt Using the permutation set from 602, and again referring to FIG. 7, the example for generating the set of symbol blocks

702-1, 702-2, and 702-3 to be used as the balanced weight sequence will now be described. A summary of the state of assembly of each symbol block is also illustrated in the following table, where t represents the time and r represents the random number that is generated by a random number generator that may be used as the index i to retrieve each arrangement from the permutation set, and X represents an as-of-yet undetermined symbol for that position of the symbol block:

TABLE 3

Example of Sequence Generation using a Permutation Set

| Symbol Block | t = 0, r = NA | t = 1, r = 0 | t = 2, r = 2 | t = 3, r = 3 | t = 4, r = 1 |
|---|---|---|---|---|---|
| 702-1 | XXXX | a̲XXX | ab̲XX | abb̲X | abba̲ |
| 702-2 | XXXX | b̲XXX | ba̲XX | bac̲X | bacc̲ |
| 702-3 | XXXX | c̲XXX | cc̲XX | cca̲X | ccab̲ |

Thus, at initialization time (t=0), as discussed above, none of the symbol blocks 702-1, 702-2, and 702-3 have been assigned with any symbols. At a first time period (t=1), where the random number generator has generated a random number r of 0, the arrangement at index i, which is arrangement(0) in this case as the random number r is to be used as the index i, will be selected. Thus, referring to Table 2, each symbol in the arrangement(0) "bac" will be assigned as the second symbol of the symbol blocks 702-1, 702-2, and 702-3, respectively.

In general, if j is a position in each symbol block, the sequence generator will select one of the permutations from the permutation set using the pseudorandom number to be used to fill in the symbols at the j-th position of each symbol block. Thus, if the pseudorandom number generated by the random number generator is of a number r, then the arrangement from the permutation set having an index of i=r may be selected and used to assemble the set of symbol blocks at the j-th position of each symbol block.

At 608, it is determined if enough arrangements have been selected by progressing through all values of j, where j ranges from 1 through N/M, which in this case N/M=4. If so, the operation may continue with step 610.

At 610, the sequence generation module 306 may assemble the balanced weight sequence by combining the symbol blocks generated from the randomly selected arrangements. It should be noted for purposes of the example given in Error! Reference source not found, the symbol blocks are built-up based on randomly selected arrangements from the permutation set of Table 2 using one approach. The actual sequence may permutation process) as illustrated in Error! Reference source not found. as well as FIG. 7, the sequence may be represented as:

SEQ (4)=abbabacccab.

As there is a total of N!/[(N/M)!*(N/M)! . . . *(N/M)!] sequences that satisfy this "m-times" property with M-ary symbols, the approach as exemplified by the permutation process 600 is able to generate ((N/M)!)^M sequences.

In general, because the sequence generation processes described herein begins with a set of symbols preconfigured to include a balanced set of symbols and the only operations performed on it are such operations as cyclic shift operations across symbol block boundaries, or random selections of arrangements from a permutation set, a total number of each symbol in a sequence of a particular length may remain unchanged across all sequences generated. In other words, the sequence generation process described herein generates sequences having a pre-balanced property such that they include a balanced set of symbols and maintains the balanced property even as those sequences are manipulated to form a large set of usable sequences. Preferably, to maintain the pre-balanced property, in one aspect of the disclosed approach the sequences are constructed of lengths that are multiples of M.

For example, using an M-ary symbol set, sequences may be balanced when the symbols chosen are: (1) balanced as considered over all M symbol blocks used to create the sequence for the cyclic shift approach; or (2) balanced as considered over each symbol block that may be used to create the sequence for the permutation approach. Further, 2^(N/M) sequences may be obtained using the cyclic shift approach, and ((N/M)!)^M sequences may be obtained using the permutation approach, the number of which from either approach is significantly greater when compared to the N sequence set that a configuration as Gold codes would yield.

A wireless node such as any one of the wireless devices described herein may include various components that perform functions based on signals (e.g., comprising information such as data) that are transmitted by or received at the wireless node (e.g., via a transmitter or receiver). For example, a wireless headset may include a transducer configured to provide an audio output based on the information or provide an audio output that associated with (e.g., based on or used to control transmission of) data that is transmitted in conjunction with a synchronization signal. A wireless watch may include a user interface configured to provide an indication based on the information or provide an indication that associated with (e.g., based on or used to control transmission of) data that is transmitted in conjunction with a synchronization signal. A wireless sensing device may include a sensor configured to sense based on the information (e.g., based on a request included in the information) or configured to provide data that is transmitted in conjunction with a synchronization signal.

A wireless node such as any one of the wireless devices described herein may communicate via one or more wireless communication links that are based on or otherwise support any suitable wireless communication technology. For example, in some aspects of the disclosed approach, a wireless node may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless node may support or otherwise use one or more of a variety of wireless communication technologies, protocols, or standards such as, for example, CDMA, TDMA, OFDM, OFDMA, WiMAX, and Wi-Fi. Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

In some aspects, a wireless node such as one of the wireless devices described herein may communicate via an impulse-based wireless communication link. For example, an impulse-based wireless communication link may utilize ultra-wideband pulses that have a relatively short length (e.g., on the order of a few nanoseconds or less) and a relatively wide bandwidth. The ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device. These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects, a wireless node such as one of the wireless devices described herein may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

Figure 8:
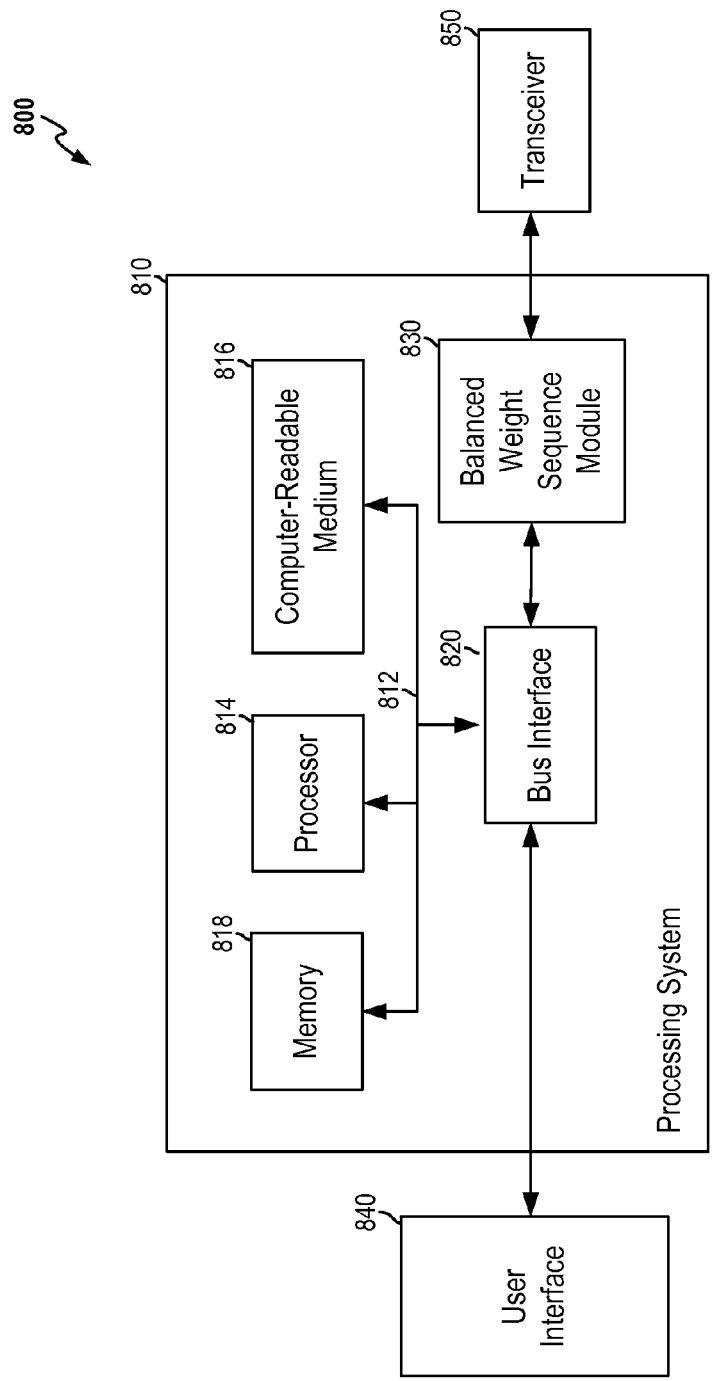
FIG. 8 is a block diagram illustrating an example of a hardware implementation for an apparatus employing a processing system configured in accordance with various aspects of the balanced weight sequence generation process described herein.

FIG. 8 is a conceptual diagram illustrating an example of a hardware implementation for an apparatus 800 employing a processing system 810 that may be used in accordance with various aspects of the disclosed approach for balanced weight sequence generation. Thus, in accordance with various aspects of the disclosure, an element, or any portion of an element, or any combination of elements for balanced weight preamble sequence generation and use thereof in a communication protocol, including a wireless node, may be implemented with the processing system 810.

The processing system 810 includes a balanced weight sequence module 830 that may be configured in accordance with various aspects of the disclosed approach to generate, store, and/or use balanced weight preamble sequences in combination with other elements in the processing system 810. For example, the processing system 810 includes one or more processors illustrated as a processor 814. Examples of processors 814 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 814 may be used by the balanced weight sequence module 830 to perform such functions as random number generation in a manner as described for the LFSR 302, as illustrated in FIG. 3. The processor 814 may be used by the balanced weight sequence module 830 to assemble or construct symbol blocks in a manner as described for the symbol block assembly/construction module 304, as illustrated in FIG. 3. Further, the processor 814 may be used by the balanced weight sequence module 830 to generate sequences in a manner as described for the symbol generation module 306, as illustrated in FIG. 3

In this example, the processing system 810 may be implemented as having a bus architecture, represented generally by a bus 812. The bus 812 may include any number of interconnecting buses and bridges depending on the specific application of the processing system 810 and overall design constraints. The bus 812 links together various circuits including one or more processors (represented generally by the processor 814), a memory 818, and computer-readable media (represented generally by a computer-readable medium 816). The bus 812 may also link various other circuits such as timing sources, peripherals, voltage regulators, and power management circuits, which are well known in the art, and therefore, will not be described any further. A bus interface 820 provides an interface between the bus 812 and a transceiver 850. The transceiver 850 provides a means for communicating with various other apparatus over a transmission medium. Depending upon the nature of the apparatus, a user interface 840 (e.g., keypad, display, speaker, microphone, joystick) may also be provided.

The processor 814 is responsible for managing the bus 812 and general processing, including execution of software that may be stored on the computer-readable medium 816 or the memory 818. The software, when executed by the processor 814, causes the processing system 810 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 816 or the memory 818 may also be used for storing data that is manipulated by the processor 814 when executing software. For example, this data may include generated or assembled symbol blocks, sequences created from these symbol blocks, seed values used in the random number generator, and the random numbers used to generate the symbol blocks and create the sequences. This data may also include any variables or temporary storage values needed for operation of the processing system 800, including any temporary storage needed to cache symbols during a cyclic-shift process such as the cyclic shift approach, or store partially assembled symbol blocks during permutation set approach.

The computer-readable medium 816 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. Although illustrated as residing in the processing system 810, the computer-readable medium 816 may reside externally to the processing system 810, or distributed across multiple entities including the processing system 810. The computer-readable medium 816 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one configuration, wireless nodes for wireless communication such as the first, second, and third wireless devices 110, 140, and 160 includes means for generating a first set of symbols, wherein the first set of symbols comprising a pre-balanced property; means for rearranging positions of at least two symbols in the first set of symbols to form a second set of symbols, wherein the second set of symbols maintains the pre-balanced property; and means for transmitting a preamble sequence based on the second set of symbols. In one aspect of the disclosed approach, the aforementioned means may include the symbol block assembly/construction module 304 for generating the first set of symbols. The means for rearranging positions of at least two symbols in the first set of symbols to form the second set of symbols may include the symbol generation module 306. The means for transmitting the preamble sequence based on the second set of symbols may be the transceiver 850 in the processing system 810 of FIG. 8. Further, one or more processors in the processing system 810 may be configured as means for performing the functions recited by the aforementioned means. In yet another aspect, the aforementioned means may be a module or any apparatus configured to perform the functions recited by the aforementioned means.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

Figure 9:
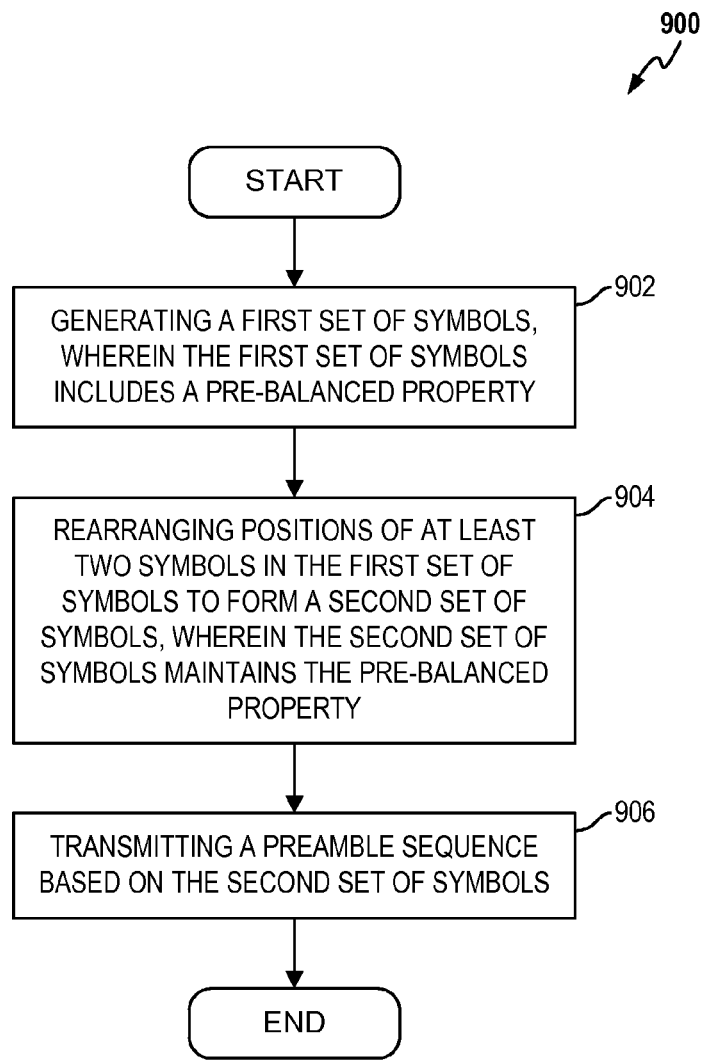
FIG. 9 is a flow diagram illustrating a permutation process for generating a balanced weight sequence of length N using randomly selected arrangements of M-ary symbols from a permutation symbol set.

As another example of some of the various aspects of the disclosed approach, FIG. 9 illustrates a wireless communication process 900 that may be configured to use balanced Hamming weight preamble sequences that are created using the disclosed approach where, at 902, a first set of symbols is generated. In one aspect of the disclosed approach, the first set of symbols includes a pre-balanced property. After the first set of symbols has been generated then, at 904, positions of at least two symbols in the first set of symbols are rearranged to form a second set of symbols. In one aspect of the disclosed approach, the second set of symbols maintains the pre-balanced property. Then, at 906, a preamble sequence based on the second set of symbols may be transmitted.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Unless specifically stated otherwise, the term "some" refers to one or more. A phrase referring to "at least one of" a list of items refers to any combination of those items, including single members. As an example, "at least one of: A, B, or C" is intended to cover: A; B; C; A and B; A and C; B and C; and A, B and C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication comprising:
generating a first set of symbols, wherein the first set of symbols comprises a pre-balanced property;
rearranging positions of at least two symbols in the first set of symbols to form a second set of symbols, wherein the second set of symbols maintains the pre-balanced property; and
transmitting a preamble sequence based on the second set of symbols, wherein the preamble sequence comprises an M-ary symbol sequence and wherein the pre-balanced property comprises the first set of symbols having an equal number of each of the M-ary symbols.

2. The method of claim 1, wherein the rearranging of the first set of symbols comprises randomly rotating a grouping of the first set of symbols.

3. The method of claim 2, wherein the randomly rotating the grouping of the first set of symbols comprises:
identifying first and second symbols in the first set of symbols; and
swapping their positions based on a randomly generated number.

4. The method of claim 1, wherein the rearranging of the first set of symbols to form the second set of symbols comprises randomly choosing at least one symbol from the first set of symbols.

5. The method of claim 4, wherein the randomly choosing the at least one symbol from the first set of symbols comprises:
creating a plurality of arrangements from the first set of symbols, wherein each arrangement comprises all symbols from an M-ary symbol set; and
randomly selecting one arrangement from the plurality of arrangements.

6. The method of claim 5, wherein each arrangement comprises an ordering of all symbols from the M-ary symbol set, and wherein the ordering for each arrangement is unique.

7. The method of claim 1, further comprising generating a third set of symbols, wherein the third set of symbols maintains the pre-balanced property.

8. The method of claim 7, wherein the second set of symbols and the third set of symbols comprises good correlation properties.

9. An apparatus for wireless communication, comprising:
means for generating a first set of symbols, wherein the first set of symbols comprises a pre-balanced property;
means for rearranging positions of at least two symbols in the first set of symbols to form a second set of symbols, wherein the second set of symbols maintains the pre-balanced property; and
means for transmitting a preamble sequence based on the second set of symbols, wherein the preamble sequence comprises an M-ary symbol sequence and wherein the pre-balanced property comprises the first set of symbols having an equal number of each of the M-ary symbols.

10. The apparatus of claim 9, wherein the means for rearranging of the first set of symbols comprises means for randomly rotating a grouping of the first set of symbols.

11. The apparatus of claim 9, wherein the means for randomly rotating the grouping of the first set of symbols comprises:
means for identifying first and second symbols in the first set of symbols; and
means for swapping their positions based on a randomly generated number.

12. The apparatus of claim 10, wherein the means for rearranging of the first set of symbols to form the second set of symbols comprises means for randomly choosing at least one symbol from the first set of symbols.

13. The apparatus of claim 12, wherein the means for randomly choosing the at least one symbol from the first set of symbols comprises:
means for creating a plurality of arrangements from the first set of symbols, wherein each arrangement comprises all symbols from an M-ary symbol set; and
means for randomly selecting one arrangement from the plurality of arrangements.

14. The apparatus of claim 13, wherein each arrangement comprises an ordering of all symbols from the M-ary symbol set, and wherein the ordering for each arrangement is unique.

15. The apparatus of claim 9, further comprising means for generating a third set of symbols, wherein the third set of symbols maintains the pre-balanced property.

16. The apparatus of claim 15, wherein the second set of symbols and the third set of symbols comprises good correlation properties.

17. A computer program product, comprising:
a non-transitory computer-readable storage medium comprising code executable by a processing system for:
generating first a set of symbols, wherein the first set of symbols comprises a pre-balanced property;
rearranging positions of at least two symbols in the first set of symbols to form a second set of symbols, wherein the second set of symbols maintains the pre-balanced property; and
transmitting a preamble sequence based on the second set of symbols, wherein the preamble sequence comprises an M-ary symbol sequence and wherein the pre-balanced property comprises the first set of symbols having an equal number of each of the M-ary symbols.

18. The computer program product of claim 17, wherein the code for rearranging of the first set of symbols comprises code for randomly rotating a grouping of the first set of symbols.

19. The computer program product of claim 18, wherein the code for randomly rotating the grouping of the first set of symbols comprises:

code for identifying first and second symbols in the first set of symbols; and code for swapping their positions based on a randomly generated number.

20. The computer program product of claim 17, wherein the code for rearranging of the first set of symbols to form the second set of symbols comprises code for randomly choosing at least one symbol from the first set of symbols.

21. The computer program product of claim 20, wherein the code for randomly choosing the at least one symbol from the first set of symbols comprises:

code for creating a plurality of arrangements from the first set of symbols, wherein each arrangement comprises all symbols from an M-ary symbol set; and code for randomly selecting one arrangement from the plurality of arrangements.

22. The computer program product of claim 21, wherein each arrangement comprises an ordering of all symbols from the M-ary symbol set, and wherein the ordering for each arrangement is unique.

23. The computer program product of claim 17, further comprising code for generating a third set of symbols, wherein the third set of symbols maintains the pre-balanced property.

24. The computer program product of claim 23, wherein the second set of symbols and the third set of symbols comprises good correlation properties.

25. An apparatus for wireless communication, comprising:
at least one processor; and
a memory coupled to the at least one processor and configured to cause the least one processor to:
generate first a set of symbols, wherein the first set of symbols comprises a pre-balanced property;
rearrange positions of at least two symbols in the first set of symbols to form a second set of symbols, wherein the second set of symbols maintains the pre-balanced property; and
transmit a preamble sequence based on the second set of symbols, wherein the preamble sequence comprises an M-ary symbol sequence and wherein the pre-balanced property comprises the first set of symbols having an equal number of each of the M-ary symbols.

26. The apparatus of claim 25, wherein the memory is further configured to cause the at least one processor to randomly rotate a grouping of the first set of symbols.

27. The apparatus of claim 26, wherein the memory is further configured to cause the at least one processor to randomly rotate the grouping of the first set of symbols by:

identifying first and second symbols in the first set of symbols; and swapping their positions based on a randomly generated number.

28. The apparatus of claim 25, wherein the memory is further configured to cause the at least one processor to rearrange the first set of symbols to form the second set of symbols by randomly choosing at least one symbol from the first set of symbols.

29. The apparatus of claim 28, wherein the memory is further configured to cause the at least one processor to randomly choose the at least one symbol from the first set of symbols by:

creating a plurality of arrangements from the first set of symbols, wherein each arrangement comprises all symbols from an M-ary symbol set; and randomly selecting one arrangement from the plurality of arrangements.

30. The apparatus of claim 29, wherein each arrangement comprises an ordering of all symbols from the M-ary symbol set, and wherein the ordering for each arrangement is unique.

31. The apparatus of claim 25, wherein the memory is further configured to cause the at least one processor to generate a third set of symbols, wherein the third set of symbols maintains the pre-balanced property.

32. The apparatus of claim 31, wherein the second set of symbols and the third set of symbols comprises good correlation properties.

* * * * *